United States Patent
Bernard et al.

(10) Patent No.: US 6,210,833 B1
(45) Date of Patent: *Apr. 3, 2001

(54) NICKLE POSITIVE ELECTRODE FOR AN ALKALINE STORAGE CELL

(75) Inventors: Patrick Bernard; Claudette Audry, both of Massy (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,907

(22) Filed: Feb. 26, 1998

(30) Foreign Application Priority Data

Feb. 9, 1998 (FR) .................................................. 98 01468

(51) Int. Cl.[7] ...................................................... H01M 4/52
(52) U.S. Cl. ........................................ 429/223; 429/231.8
(58) Field of Search ................................ 429/223, 231.7, 429/231.8, 231.4; 420/900

(56) References Cited

U.S. PATENT DOCUMENTS 4,367,208   1/1983   Glasstetter et al. .

FOREIGN PATENT DOCUMENTS 0 587 974   3/1994   (EP) .
0 634 804   1/1995   (EP) .

OTHER PUBLICATIONS

Yunchang D et al: "A Study of the Performance of a Past–Type Nickel Cathode" Journal of Power Sources, vol. 56, No. 2, Aug. 1, 1995, pp. 201–204, XP000589879.

Chemical Abstracts, vol. 84, No. 22, May 31, 1976, Columbus, Ohio, US; abstract No. 153085 Mukunoki, Junji et al: "Cathode for alkaline batteries" XP002081989 & JP 50 092427 (Matsushita Electric Industrial Co., Ltd, Japan).

Database WPI Section Ch, Week 9515 Derwent Publications Ltd., London GB; AN 95–110329 XP 002081848 & JP 07 033420 (Toho Rayan KK), Feb. 3, 1995–& Patent Abstracts of Japan, vol. 95, No. 5, Jun. 30, 1995 & JP 07033420 (Toho Rayan Co Ltd), Feb. 3, 1995.

Takeshima H et al: "Study on a Conductive Material for Nickel Positive Electrode" Extended Abstracts Fall Meeting Oct. 8/13 1995, St. Louis, Missouri, vol. 95/2, 1995, p. 172 XP000553887.

Patent Abstracts of Japan vol. 097, No. 005, May 30, 1997 & JP 09 007587 (Matsushita Electric Ind Co Ltd), Jan. 10, 1997.

M. Bregazzi: "Acetylene Black" Electrochemical Technology., vol. 5, No. 11–12, 1967, pp. 507–513, XP 002081942 Princeton, New Jersey US.

*Primary Examiner*—Stephen Kalafut
*Assistant Examiner*—M. Wills
(74) *Attorney, Agent, or Firm*—Sughrue, Mion, Zinn, Macpeak & Seas, PLLC

(57) ABSTRACT

A pasted nickel electrode for a storage cell having an alkaline electrolyte, the electrode comprising a current collector and an active mass based on nickel hydroxide in powder form together with a carbon-based conductor, the electrode being characterized by the fact that said carbon-based conductor is made up of particles of carbon that withstand electrochemical oxidation and that satisfy the following relationship:

$W > 0.025$ in units of $10^9$ g/m, where $W = TC002/S \times G$, where

TC002 is the size of the [002] crystallite on the X-ray diffraction pattern expressed in nanometers;

S is the specific surface area of the particles expressed in $m^2/g$;

G is the graphitization coefficient of the carbon defined as follows:

$$G = (d002 - 0.3354)/(0.3450 - 0.3354)$$

d002 is the lattice constant in the 002 direction in nanometers.

11 Claims, No Drawings

NICKLE POSITIVE ELECTRODE FOR AN ALKALINE STORAGE CELL

The present invention relates to a nickel electrode used in particular as a positive electrode in a storage cell having an alkaline electrolyte. The invention also extends to the method of manufacturing the electrode.

Several types of electrode are in existence that are suitable for use in an alkaline electrolyte storage cell, such as an electrode of the pocket type or a sintered electrode. To satisfy the increasing requirements of users, these electrodes can nowadays be made by the paste method. Compared with other types of electrode, a pasted electrode contains a larger quantity of active material, thereby increasing its capacity per unit volume, and it is cheaper to manufacture.

A pasted nickel electrode is made by depositing a paste on a two-dimensional conductive support such as expanded metal, a grid, a cloth, or a solid or perforated sheet, or indeed on a porous three-dimensional conductive support such as a metal or carbon felt or foam. A paste comprising as its main components the active material, usually in powder form, and a polymer binder, usually in association with a conductive material is then inserted into such a structure. While the electrode is being made, a volatile solvent is added to the paste to adjust its viscosity and thus make it easier to shape. Once the paste has been deposited on or in the support, the paste-and-support assembly is compressed and dried to obtain an electrode of desired density and thickness.

In a pasted nickel electrode, the active material is constituted by a nickel-based hydroxide. Nickel hydroxide is a compound that conducts electricity poorly and that requires a material suitable for ensuring good percolation of electricity to be added in the electrode. The paste thus generally contains a conductive material which may, for example, be a cobalt compound such as metallic cobalt Co, a cobalt hydroxide $Co(OH)_2$, and/or a cobalt oxide CoO. On the first occasion that the alkaline storage cell is charged, these compounds are oxidized into cobalt oxyhydroxide CoOOH in which the oxidation number of the cobalt is raised to +3. Cobalt oxyhydroxide is stable in the normal operating range of the nickel positive electrode and it is insoluble in the alkaline electrolyte. It enables electricity to percolate in the electrode.

When stored in the fully discharged state, an alkaline storage cell having a pasted nickel positive electrode suffers from a decrease in voltage over time. When the duration of storage exceeds a few months, its voltage tends towards 0 V. Under such conditions, the cobalt oxyhydroxide reduces slowly. The oxidation number of the cobalt goes firstly to +2.66 in $Co_3O_4$, followed by oxidation number +2 in $Co(OH)_2$, and finally reaching oxidation number 0 in Co.

Unfortunately, cobalt hydroxide $Co(OH)_2$ is a compound that is highly soluble in the electrolyte. Consequently, after a storage period of several months, a loss of conductivity is observed due to the percolation array of the pasted electrode being partially dissolved. That phenomenon leads to the cobalt present in the positive electrode being redistributed in non-uniform manner, with preferential increase of cobalt particles of large dimensions to the detriment of small particles. This gives rise to an irreversible loss of capacity that can exceed 20%. This irreversible loss of capacity takes place regardless of the particular cobalt compound that was initially included in the paste.

European patent application EP 0 634 804 proposes increasing the conductivity of the positive electrode by including in the paste a carbon powder having a lattice constant d002 such that 0.335 nm<d002<0.345 nm.

European patent EP-A-0 658 978 proposes using graphite having crystallite size of 2000 Å and with an ash content of less than 0.5%. Nevertheless, it is well known that graphites have particles of very large sizes, in excess of one micron or even ten microns, thus making them unsuitable for use in a storage cell of high energy density. To obtain good electrode conductivity, it would be necessary to add an unacceptable amount of conductor.

An object of the present invention is to propose a pasted electrode which does not suffer irreversible loss of capacity in storage, when compared with presently known electrodes.

The present invention provides a pasted nickel electrode for a storage cell having an alkaline electrolyte, the electrode comprising a current collector and an active mass based on nickel hydroxide in powder form together with a carbon-based conductor, the electrode being characterized by the fact that said carbon-based conductor is made up of particles of carbon that withstand electrochemical oxidation and that satisfy the following relationship:

W>0.025 in units of $10^9$ g/m, where
W=TC002/S×G, where
TC002 is the [002] crystallite size on the X-ray diffraction pattern expressed in nanometers;
S is the specific surface area of the particles expressed in $m^2/g$;
G is the graphitization coefficient of the carbon defined as follows:

$G=(d002-0.3354)/(0.3450-0.3354)$ d002 is the lattice constant in the 002 direction in nanometers.

The X-ray diffraction pattern was made under the following conditions:
tube voltage: 40 kV
tube current: 30 mA
scanning speed: 0.9°/min
copper Kα line: 0.154 nm.

Preferably, said carbon particles constitute a fraction lying in the range 4% to 15% by weight of the active material of the nickel positive electrode. At higher values, the capacity of the electrode per unit volume decreases because of the high proportion of conductor in the electrode.

The term "carbon particles" covers particles of any shape, going from particles that are more or less spherical in shape to particles that are completely irregular, and including fibers.

When the particles are substantially spherical in shape, their mean diameter $D_1$ is less than or equal to D/20 where D is the mean diameter of the powder grains of said active material, with D advantageously lying in the range 5 μm to 15 μm.

$D_1$ is preferably less than or equal to D/100, and in particular less than or equal to 0.1 μm.

When the particles are in the form of fibers, their mean diameter $D_2$ is less than or equal to D and their mean length $L_2$ is greater than or equal to 25 times the value of $D_2$.

$L_2$ is preferably greater than or equal to 75 times the value of $D_2$.

Naturally, the term "nickel hydroxide" as used in the present application covers not only a nickel hydroxide or a hydroxide containing mainly nickel, but also at least one hydroxide syncrystallized with an element selected from cobalt, manganese, and at least one hydroxide syncrystallized from an element selected from cadmium, zinc, magnesium, calcium, yttrium, copper, and aluminum.

In an embodiment of the electrode of the invention, the current collector is a nickel foam, and said paste contains said active material, said conductors, a first binder based on polytetrafluoroethylene (PTFE), and a second binder selected from carboxymethylcellulose (CMC), hydroxypropylmethylcellulose (HPMC), hydroxyethylcellulose (HEC), hydroxypropylcellulose (HPC), polyvinylidene fluoride (PVDF), and styrene butadiene rubber (SBR).

The invention will be better understood and other advantages and features thereof will appear on reading the following examples given by way of non-limiting illustration.

EXAMPLE 1

Standard nickel electrodes "a" not forming part of the invention were made using a paste whose composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

metal cobalt: 1%;

cobalt oxide CoO: 5% water: 26.2%;

CMC-based gel: 0.3%;

PTFE: 1.5%.

The paste obtained in that way was inserted into a nickel foam having porosity of about 95%. The foam-and-paste assembly was dried and then rolled to obtain the electrodes "a".

EXAMPLE 2

In accordance with the invention, carbon fibers were used having a crystallite size in the 002 direction (TC002) of 2.5 nm, with a graphitization coefficient G of 0.77, and a specific surface area S of 0.5 m$^2$/g. It will be understood that the coefficient W was W=2.5/077×0.5, i.e. W=6.5×10$^9$ g/m.

The fibers had a mean diameter $D_2$ equal to 6 μm and a mean length $L_2$ equal to 200 μm.

Nickel electrodes "b" were made using a paste whose composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

carbon fibers of the invention: 8%;

water: 28%;

CMC-based gel: 0.3%;

PTFE: 1.7%.

EXAMPLE 3

In accordance with the invention, carbon fibers having a crystallite size in the 002 direction (TC002) of 1.2 nm were used, having a graphitization coefficient G of 1.42 and a specific surface area S of 0.6 m$^2$/g. Consequently W=1.4×10$^9$ g/m.

The fibers had a mean diameter $D_2$ equal to 8 μm and a mean length $L_2$ equal to 250 μm.

Nickel electrodes "c" were made using a paste whose composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

carbon fibers of the invention: 8%;

water: 28%;

CMC-based gel: 0.3%;

PTFE: 1.7%.

EXAMPLE 4

In accordance with the invention, a carbon powder was used having crystallite size in the 002 direction (TC002) of 2.3 nm, a graphitization coefficient G of 1.18, and a specific surface area S of 70 m$^2$/g. Consequently W=0.028×10$^9$ g/m.

The mean diameter $D_1$ of the particles of powder was about 35 nm.

Nickel electrodes "d" were made using a paste whose composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

carbon fibers of the invention: 8%;

water: 28%;

CMC-based gel: 0.3%;

PTFE: 1.7%.

EXAMPLE 5

A carbon powder was used with crystallite size in the 002 direction (TC002) of 0.86 nm, graphitization coefficient G of 3.08, and specific surface area S of 260 m$^2$/g. Consequently W=0.0011×10$^9$ g/m.

The mean diameter $D_1$ of the powder particles was 85 nm.

Nickel electrodes "e", not forming part of the invention, were made using a paste whose composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

carbon fibers of the invention: 8%;

water: 28%;

CMC-based gel: 0.3%;

PTFE: 1.7%.

EXAMPLE 6

A carbon powder was used having crystallite size in the 002 direction (TC002) of 1.49 nm, a graphitization coefficient G of 1.25, and a specific surface area S of 110 m$^2$/g. Consequently W=0.011×10$^9$ g/m.

The mean diameter $D_1$ of the powder particles was 25 nm.

Nickel electrodes "f", not forming part of the invention, were made using a paste of composition expressed in weight percentage relative to the weight of the paste was approximately as follows:

hydroxide powder having a mean diameter D of 12 μm composed for the most part of nickel, containing about 2% syncrystallized cobalt hydroxide and about 3% syncrystallized zinc hydroxide: 66%;

carbon fibers of the invention: 8%;

water: 28%;

CMC-based gel: 0.3%;

PTFE: 1.7%.

Sealed nickel metal hydride Ni-MH storage cells A were made including the previously-prepared electrodes a to f respectively. Each positive electrode was associated with a negative electrode of excess capacity made of hydridable alloy of conventional type. The positive and negative electrodes were separated by a layer of non-woven polypropylene. The sandwich was then impregnated in an alkaline electrolyte comprising an aqueous solution of 7.4N caustic potash KOH, 0.5N lithine LiOH, and 0.4N caustic soda NaOH. Respective storage cells Aa, Ab, Ac, Ad, Ae, and Af were obtained.

First Series of Tests

To characterize the resistance to oxidation of the various conductive arrays after a rest of 48 hours, the cells were tested at 20° C. under the following conditions:

Cycle 1: charging at 0.1 Ic for 10 hours at 20° C., where Ic is the current necessary for discharging the nominal capacity of a storage cell in 1 hour; discharging at 0.2 Ic down to a stop voltage of 1 volt;

Cycle 2: charging at 0.2 Ic for 5 hours at 20° C.; continuous overcharging at C/50 for 1 month at 20° C. This test makes it possible to simulate the cycling lifetime of NiMH cells for about 200 cycles.

The carbon powders or fibers used in the positive electrodes of the NiMH cells can degrade and, by oxidation, lead to a loss of electrode conductivity and to the formation of carbonates in the electrolyte. To measure the stability of these conductive compounds, the cells were disassembled and the carbonate content present in the electrolyte was measured by acid-base titration.

The results are given in Table 1.

TABLE 1

| Series | Aa | Ab | Ac | Ad | Ae | Af |
|---|---|---|---|---|---|---|
| W ($10^9$ g/m) | | 6.5 | 1.4 | 0.028 | 0.0011 | 0.011 |
| Percentage of $CO_3^{2-}$ after cycling | 19.5 | 19.5 | 21.3 | 22.3 | 37.6 | 29.9 |

From these results it can be seen that the cells Ab to Ad of the invention present a carbonate content that is much the same as the standard cell Aa, which means that the carbons used in the positive electrodes of the cells withstand electrochemical oxidation in satisfactory manner.

In contrast, cells Ae and Af for which the W criterion was respectively 0.0011 and 0.011 have carbonation rates that are 93% and 53% greater than that of the standard electrode, thus making their conductive arrays unsuitable for use in a storage cell.

Second Series of Tests

Cells Aa to Ad identical to the above were tested under the following conditions:

After resting for 48 hours, the cells having a nominal capacity Cn were subjected to an electrochemical cycling test:

Cycle 1: charging at 0.1 Ic for 10 hours at 20° C., where Ic is the current required to discharge the nominal capacity of a cell in 1 hour; discharging at 0.2 Ic until a stop voltage of 1 volt was reached;

Cycles 2 to 10: charging at 0.2 Ic for 7.5 hours at 20° C.; discharging at 0.2 Ic down to 1 volt.

The cells were then stored in the discharged state at ambient temperature. After about 2 months, it was observed that the cell voltage had become less than the voltage at which nickel oxyhydroxide is stable (1.05 V).

After 6 months' storage, the remaining capacity was measured under the following conditions:

Cycles 11 to 16: charging at 0.2 Ic for 7.5 hours at 20° C.; discharging at 0.2 Ic down to 1 volt.

Losses of capacity during storage are expressed as the ratio of the capacity per unit mass measured for cycle 16 over the capacity per unit mass measured for cycle 10. The results are given in Table 2. It can be seen that the cell having a standard electrode containing a cobalt oxide and metal cobalt suffered 12% irreversible loss of capacity due to prolonged storage. In contrast, cells Ab to Ad suffered no loss of capacity in storage.

TABLE 2

| Series | Aa | Ab | Ac | Ad |
|---|---|---|---|---|
| W ($10^9$ g/m) | | 6.5 | 1.4 | 0.028 |
| Capacity on cycle 16/ capacity on cycle 10 | 0.88 | 1 | 1 | 1 |

It is thus advantageous to replace the cobalt compounds completely with particles or fibers of carbon; however, where appropriate, such replacement can be partial only.

Naturally, the invention is not limited to the embodiments described above, and without going beyond the ambit of the invention, it is possible to replace any means by equivalent means.

What is claimed is:

1. A pasted nickel electrode for a storage cell having an alkaline electrolyte, the electrode comprising a current collector and an active mass based on nickel hydroxide in powder form together with a carbon-based conductor, the electrode being characterized by the fact that said carbon-based conductor is made up of particles of carbon that withstand electrochemical oxidation and that satisfy the following relationship:

W>0.025 in units of $10^9$ g/m, where

W=TC002/S×G, where

TC002 is the size of the [002] crystallite on the X-ray diffraction pattern expressed in nanometers;

S is the specific surface area of the particles expressed in $m^2/g$;

G is the graphitization coefficient of the carbon defined as follows:

$G=(d002-0.3354)/(0.3450-0.3354)$ d002 is the lattice constant in the 002 direction in nanometers.

2. An electrode according to claim 1, characterized by the fact that said carbon particles constitute a fraction lying in the range 4% to 15% by weight of the active material of the positive electrode.

3. An electrode according to claim 1, characterized by the fact that said particles are substantially spherical in shape with a mean diameter $D_1$ less than or equal to D/20, D being the mean diameter of the powder grains of said active material.

4. An electrode according to claim 3, characterized by the fact that $D_1$ is less than or equal to D/100.

5. An electrode according to claim 1, characterized by the fact that said particles are in the form of fibers having a mean diameter $D_2$ less than or equal to D, D being the mean diameter of the powder grains of said active material, and having a mean length $L_2$ greater than or equal to 25 times the value of $D_2$.

6. An electrode according to claim 5, characterized by the fact that the mean length $L_2$ is greater than or equal to 75 times the value of $D_2$.

7. An electrode according to claim 3, characterized by the fact that D lies in the range 5 µm to 15 µm.

8. An electrode according to claim 7, characterized by the fact that $D_1$ is less than or equal to 0.1 µm.

9. An electrode according to claim 1, characterized by the fact that said nickel hydroxide is a hydroxide containing mainly nickel but also at least one syncrystallized hydroxide of an element selected from cobalt, and manganese, and at least one syncrystallized hydroxide of an element selected from cadmium, zinc, magnesium, calcium, yttrium, copper, and aluminum.

10. An electrode according to claim 1, characterized by the fact that said current collector is a nickel foam.

11. An electrode according to claim 1, characterized by the fact that said active material contains a first binder based on polytetrafluoroethylene (PTFE), and a second binder selected from: carboxymethylcellulose (CMC); hydroxypropylmethylcellulose (HPMC); hydroxyethylcellulose (HEC); hydroxypropylcellulose (HPC); polyvinylidene fluoride (PVDF), and styrene butadine rubber (SBR).

\* \* \* \* \*